Patented Sept. 6, 1932

1,875,775

UNITED STATES PATENT OFFICE

LLOYD C. SWALLEN, OF TERRE HAUTE, INDIANA, ASSIGNOR TO COMMERCIAL SOLVENTS CORPORATION, OF TERRE HAUTE, INDIANA, A CORPORATION OF MARYLAND

RECOVERY OF METHYL AMINE

No Drawing. Application filed October 2, 1930. Serial No. 486,059.

This invention relates to a method for the recovery of methyl amine from mixtures containing ammonia. More specifically, this invention relates to a process for the recovery of methyl amine from the mixtures obtained in the catalytic synthesis of methyl amine from methanol and ammonia.

Methyl amine may be prepared from formaldehyde and ammonium chloride, from methyl cyanate, by the reduction of hydrocyanic acid, by the action of ammonia on methyl iodide, methyl nitrate, etc. However, it may best be made upon a commercial scale by catalytic synthesis from methanol and ammonia, as disclosed in co-pending applications Serial Nos. 468,992 and 468,993, filed July 18, 1930 by Lloyd C. Swallen and Jerome Martin. In this method, methanol vapor and ammonia are passed over metallic oxide dehydrating catalysts or over aluminium silicate at temperatures of from 300° to 500° C. The mixture leaving the catalyst is found to comprise methyl amine (a mixture of mono-, di-, and tri-methyl amines), ammonia, any unconverted methanol, the water which is formed in the reaction, and any decomposition products of the methanol or ammonia, such as hydrogen and carbon monoxide.

If the methyl amine is prepared by the methods first listed above, it is usually obtained in the form of a salt such as the hydrochloride, and if prepared by the method of Swallen and Martin it can easily be obtained in the form of a salt by absorbing the gases leaving the catalyst in a solution of hydrochloric, sulfuric or other acid. Since it is undesirable to use much water, (which would later have to be removed by evaporation) the preferred method for obtaining the salts from the gaseous products is to absorb simultaneously dry HCl and the reaction gases in the concentrated methyl amine hydrochloride solution from a previous run. In this way a very concentrated solution is obtained, and a large part of the ammonium chloride is found to crystallize out during the absorption. Sufficient water is usually present in the reaction products of the synthesis to dissolve the amine hydrochloride, so that saturation is not reached, and the reaction may therefore be run continuously if desired. It is seen that in using this method of preparing the salts that the concentration obtained will depend upon the water content of the reaction products. In a typical run, the reaction products being approximately 10% mono-methyl amine, 6% di- and tri-methyl amines, 60% ammonia, and 24% water, a solution of the salts containing about 8 mols of the amine salts and 0.5 mol of ammonium chloride per liter was obtained by this method. However, the actual concentration of the solution at this point is relatively unimportant since in any case the solution is further evaporated.

The method to be used for obtaining the salts and the concentration of the desired solution will depend upon economic considerations. For example, it may be found more desirable to employ a solution of hydrochloric or sulfuric acid and incur the expense of the subsequent evaporation than to use the more expensive HCl gas. In any case, an acid is to be chosen which yields an amine salt of greater solubility than the corresponding ammonium salt.

The solution of the salts, obtained in any of the above ways, is then concentrated by distillation until, on cooling, the solution is almost saturated with respect to the amine salts. In the case of the hydrochloric acid salts, it has been found that it is preferred to stop the distillation when the liquid temperature is not much in excess of 140° C., thus obtaining an approximately 10 molar solution of the amine salts. On cooling, a second crop of crystals of the ammonium salt is obtained, and the concentration in solution at this point is usually 0.03 mol or less per mol of the amine salts. In this step of the process, if the sulfuric acid salts are used it has been found desirable to distill under reduced pressure due to the tendency of the amine sulfates to decompose.

It has now been found that substantially all of the remaining ammonium salt may be stripped from this solution by passing gaseous methyl amine through the liquid. By "stripping" in this connection is meant a displacement of the ammonia from the ammonium salt by the methyl amine, and then the removal of the liberated ammonia by the stream of methyl amine gas. This may be accomplished in a number of ways, such as bubbling the gas through the liquid, passing the gas countercurrently to a stream of the liquid, etc. The following example will illustrate one convenient method for carrying out this process.

*Example*

The reaction products from the catalytic synthesis of methyl amine (containing approximately 16% amines, 60% ammonia, and 24% water) and dry HCl gas were passed simultaneously into a solution of methyl amine hydrochloride from a previous run. An approximately 8 molar solution of amine hydrochloride containing about 2 g. of ammonium chloride per 100 c. c. was thus obtained. This solution was distilled until the liquid temperature reached 140° C. and then cooled to crystallize out additional ammonium chloride. The supernatant liquid was then trickled down through a tower packed with broken glass tubing while methyl amine and steam produced by dropping a strong aqueous methyl amine solution into the heated receiving flask passed upward countercurrently to it. The methyl amine hydrochloride solution in the receiver was boiled to insure rapid vaporization of the aqueous amine solution. The amine leaving the top of the column was found to contain 2.3 mols % of ammonia, while the salt solution in the receiver contained only 0.15 mol %.

It is to be understood that the above example is merely an illustration of a method of carrying out the process and that the invention is to be in no way limited to this particular method. For example, methyl amine gas might be used instead of the mixture of the gas and steam obtained in the above method, and the stripping may be accomplished at other temperatures than that utilized in the example. It is also to be understood that the term "methyl amine" as used in the specification and claims is to include the mono-, di-, and tri-compounds and any mixtures of these.

The invention now having been described, what is claimed is:

1. A method for the recovery of methyl amine from mixtures containing ammonia which comprises converting the bases into their salts the ammonium salt being less soluble than the amines salt, concentrating the solution of the salts until almost saturated with respect to the methyl amine salt, removing the ammonium salt which crystallizes out, and stripping out the remainder of the ammonia by passing gasses methyl amine in contact with the solution.

2. A method for the recovery of methyl amine from mixtures containing ammonia which comprises converting the bases into their hydrochloric acid salts, concentrating the solution of the salts until almost saturated with respect to the methyl amine hydrochloride, removing the ammonium chloride which crystallizes out, and stripping out the remainder of the ammonia by passing gaseous methyl amine in contact with the solution.

3. A method for the recovery of methyl amine from mixtures containing ammonia which comprises converting the bases into their sulfuric acid salts, concentrating the solution of the salts until almost saturated with respect to the methyl amine sulfate, removing the ammonium sulfate which crystallizes out, and stripping out the remainder of the ammonia by passing gaseous methyl amine in contact with the solution.

4. A method for the recovery of methyl amine from mixtures obtained in the catalytic synthesis of methyl amine from methanol and ammonia which comprises converting the bases in the reaction product to their hydrochloric acid salts, concentrating the solution of the salts until almost saturated with respect to the methyl amine hydrochloride, removing the ammonium chloride which crystallizes out, and stripping out the remainder of the ammonia by passing gaseous methyl amine in contact with the solution, substantially as described herein.

5. A method for the recovery of a methyl amine salt from mixtures containing the corresponding ammonium salt said ammonium salt being less soluble than said amine salt which comprises concentrating the solution of the salts until almost saturated with respect to the methyl amine salt, removing the ammonium salt which crystallizes out, and stripping out the remainder of the ammonia by passing gaseous methyl amine in contact with the solution.

6. A method for the recovery of methyl amine hydrochloride from mixtures containing ammonium chloride which comprises concentrating the solution of the salts until almost saturated with respect to the methyl amine hydrochloride, removing the ammonium chloride which crystallizes out, and stripping out the remainder of the ammonia by passing gaseous methyl amine in contact with the solution.

7. A method for the recovery of methyl amine sulfate from mixtures containing ammonium sulfate which comprises concentrating the solution of the salts until almost saturated with respect to the methyl amine sulfate, removing the ammonium sulfate which crystallizes out, and stripping out the remainder of the ammonia by passing gaseous methyl amine in contact with the solution.

8. In a process for the recovery of methyl amine from mixtures containing ammonia, the steps which consist in converting the bases into their salts the ammonium salt being less soluble than the amines salt, concentrating the solution of the salts until almost saturated with respect to the methyl amine salt, removing the ammonium salt which crystallizes out, and stripping out the remainder of the ammonia by passing gaseous methyl amine in contact with the solution.

9. In a process for the recovery of methyl amine from mixtures containing ammonia, the steps which consist in converting the bases into their hydrochloric acid salts, concentrating the solution of the salts until almost saturated with respect to the methyl amine hydrochloride, removing the ammonium chloride which crytallizes out, and stripping out the remainder of the ammonia by passing gaseous methyl amine in contact with the solution.

10. In a process for the recovery of methyl amine from mixtures containing ammonia, the steps which consist in converting the bases into their sulfuric acid salts, concentrating the solution of the salts until almost saturated with respect to the methyl amine sulfate, removing the ammonium sulfate which crystallizes out, and stripping out the remainder of the ammonia by passing gaseous methyl amine in contact with the solution.

11. In a process for the recovery of methyl amine from mixtures obtained in the catalytic synthesis of methyl amine from methanol and ammonia, the steps which consist in converting the bases in the reaction product to their hydrochloric acid salts, concentrating the solution of the salts until amost saturated with respect to the methyl amine hydrochloride, removing the ammonium chloride which crystallizes out, and stripping out the remainder of the ammonia by passing gaseous methyl amine in contact with the solution.

12. In a process for the recovery of a methyl amine salt from mixtures containing the corresponding ammonium salt, said ammonium salt being less soluble than the amine salt, the steps which consist in concentrating the solution of the salts until almost saturated with respect to the methyl amine salt, removing the ammonium salt which crystallizes out, and stripping out the remainder of the ammonia by passing gaseous methyl amine in contact with the solution.

13. In a process for the recovery of methyl amine hydrochloride from mixtures containing ammonium chloride, the steps which consist in concentrating the solution of the salts until almost saturated with respect to the methyl amine hydrochloride, removing the ammonium chloride which crystallizes out, and stripping out the remainder of the ammonia by passing gaseous methyl amine in contact with the solution.

14. In a process for the recovery of methyl amine sulfate from mixtures containing ammonium sulfate, the steps which consist in concentrating the solution of the salts until almost saturated with respect to the methyl amine sulfate, removing the ammonium sulfate which crystallizes out, and stripping out the remainder of the ammonia by passing gaseous methyl amine in contact with the solution.

15. In a process for the recovery of a methyl amine salt from mixtures containing the corresponding ammonium salt, said ammonium salt being less soluble than the amine salt, the step which comprises stripping out at least a part of the ammonia by passing gaseous methyl amine in contact with the solution of the salts.

16. In a process for the recovery of methyl amine hydrochloride from mixtures containing ammonium chloride, the step which comprises stripping out at least a part of the ammonia by passing gaseous methyl amine in contact with the solution of the salts.

17. In a process for the recovery of methyl amine sulfate from mixtures containing ammonium sulfate, the step which comprises stripping out at least a part of the ammonia by passing gaseous methyl amine in contact with the solution of the salts.

In testimony whereof I affix my signature.

LLOYD C. SWALLEN.